April 20, 1937.  W. WOELFLIN  2,077,505
ELECTRIC SEPARATOR AND METHOD
Filed June 17, 1932
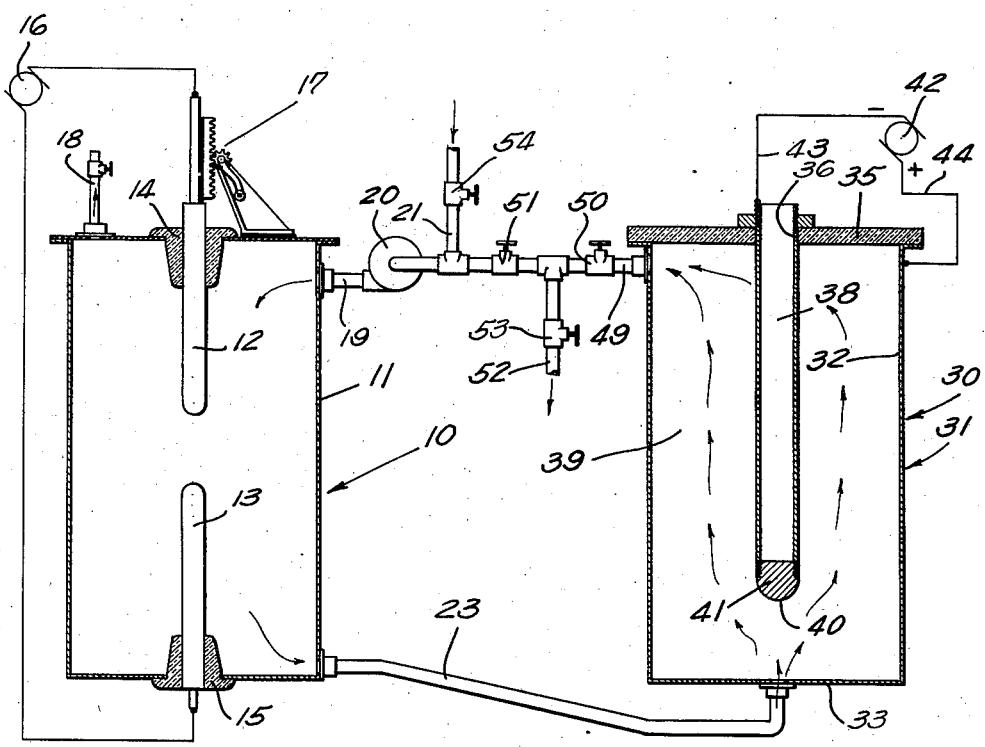
INVENTOR:
WILLIAM WOELFLIN,
By
ATTORNEY.

Patented Apr. 20, 1937

2,077,505

UNITED STATES PATENT OFFICE 2,077,505

ELECTRIC SEPARATOR AND METHOD

William Woelflin, Long Beach, Calif., assignor to Petroleum Rectifying Company of California, Los Angeles, Calif., a corporation of California Application June 17, 1932, Serial No. 617,835

17 Claims. (Cl. 204—1) .

My invention relates to a novel method and apparatus for separating minute particles suspended in a liquid phase, and finds particular utility in separating carbon particles which have been formed in situ in a petroleum product through the action of an electric arc or other means.

One recently developed method of forming a very pure grade of carbon utilizes an electric arc for precipitating carbon particles in a petroleum product when subjected to the action of the electric arc. Such a petroleum product may be in various forms, and it is possible to utilize crude oil in this capacity. In other instances the petroleum product may comprise a low grade distillate as Diesel oil or gas oil. The electric arc acts upon the petroleum product to form minute carbon particles which tend to remain in suspension therein and which can be separated therefrom only by filtration or prolonged settling. It has been found necessary to recycle the petroleum product so that it repeatedly comes under the influence of the electric arc. In the conventional mode of operation, no attempt is made to separate the suspended carbon before the petroleum product is again brought under the influence of the electric arc.

I have found it desirable to remove the suspended carbon particles prior to the time that the petroleum product is recycled into the vicinity of the electric arc, and it is an object of the present invention to provide such a method, as well as an apparatus whereby this can be accomplished. This mode of operation results in a clean petroleum product being introduced into the electric arc at all times, and the carbon particles previously formed are not present in the arc to interfere with the effectiveness thereof.

It is a further object of the invention to provide an improved cataphoretic process whether applied to carbon removal or to the removal of other foreign matter from a liquid.

Another object of the invention is to provide a novel combination including a cataphoretic separator through which a suspension is moved prior to being recycled into an electric treater.

The electric separator itself is novel in several regards. In this connection I have found it very desirable to utilize concentric electrodes whereby the field intensity adjacent the inner electrode is greater than the field intensity adjacent the outer electrode. I have found in addition that it is imperative for best results to prevent the field adjacent either the inner or outer electrode from concentrating at any particular section or point, and it is an object of the present invention to provide an electric separator in which the field adjacent either electrode is substantially uniform as distinguished from being concentrated at one or more sections or points.

Still further objects of the invention lie in other features of the electric separator and will be apparent to those skilled in the art from the following description.

In the annexed drawing I have disclosed very diagrammatically a system capable of performing the process to be herein described. It should be understood, however, that other apparatus may be utilized, and that I am not limited to the use of the particular structures diagrammatically shown in the drawing.

Referring particularly to this drawing, I have disclosed an electric treater 10, the particular design of which is per se not a part of the present invention. This treater has been diagrammatically shown as comprising a tank 11 into which electrodes 12 and 13 extend, these electrodes being insulated from the tank by insulators 14 and 15 and being suitably connected to a source of potential indicated by the numeral 16. Such electric-arc treaters are well-known in the art, the showing of the drawing being merely diagrammatic. A mechanism 17 is shown for moving the upper electrodes 12 with respect to the electrode 13. As is well-known in the art, these electrodes can be brought into close proximity and if substantially moved apart after an arc has formed therebetween, this arc will be drawn out and will extend between the ends of the electrodes 12 and 13. A vent 18 is usually needed.

Suitable means is provided for introducing the petroleum product into the vicinity of the arc. In the drawing I have diagrammatically illustrated an intake pipe 19 including a pump 20 for drawing the petroleum product through a pipe 21 and moving it into the electric treater 10 and and into the influence of the electric arc. As previously explained, this electric arc acts upon the petroleum product to precipitate minute carbon particles therein. This suspension is removed by any suitable means such as a discharge pipe 23, and in conventional practice the discharge pipe 23 communicates with the intake of the pump 20 so that a given body of petroleum product is repeatedly recycled through the tank 11 so as to be repeatedly acted upon by the electric arc. This mode of operation is not conducive to the best results, for it will at once be apparent that the recycled petroleum product contains the suspended carbon particles previously precipitated therein with a result that the action of the electric arc is impeded by the presence of the carbon particles. The speed of treatment is also greatly decreased by such a mode of operation.

In order to secure a maximum amount of carbon suspension, the petroleum product is moved through the electric arc relatively slowly. In the present process it is possible to move the petroleum product through the electric arc at a greater velocity if desired, this resulting in only a partial precipitation. In the present invention the precipitate thus formed is removed prior to the time that the petroleum product is again moved into the electric arc.

This separation is effected by the use of an electric separator 30 diagrammatically shown as comprising a container 31, the side wall of which comprises an outer electrode 32. The lower end of the container 31 is closed by a wall 33, and the discharge pipe 23 communicates with the interior of the container 31 through this wall so as to direct the incoming suspension axially into the container 31 in an upward direction. The upper end of the container 31 is closed by an insulator 35 which is removably connected thereto by any suitable means. Extending through a central opening 36 of the insulator 35 is an inner electrode 38 which extends centrally into the container 31, cooperating with the outer electrode 32 in defining a treating space 39.

This inner electrode is shown as comprising a length of pipe, the exterior of which is surfaced to provide a smooth outer face. The lower end of the inner electrode 38 is in the form of a convex surface 40 which is shown as being formed by a head defined by a plug 41 fitted into the lower end of this pipe. Regardless of whether or not a plug 41 separate from the pipe is utilized, it has been found to be very desirable to so form the convex surface 40 that it in effect forms a continuation of the smooth external surface of the inner electrode so that no points or projections are present which would tend to concentrate the field thereadjacent.

A potential difference is established between the inner and outer electrodes by means of a unidirectional potential supply source shown as comprising a generator 42. It has been found that much superior action can be obtained if the negative pole of the supply source is connected to the inner electrode 38, as by a conductor 43, while the positive terminal is connected to the outer electrode 32, as by a conductor 44. There is thus established in the treating space 39 a unidirectional electric field which is more intense adjacent the inner electrode than adjacent the outer electrode. With the potential supply source connected as shown the field intensity will be greatest adjacent the negative electrode. It is an important feature of the present invention to so design the central electrode that the field thereadjacent is substantially of the same intensity at all positions adjacent the surface thereof. If the plug 41 is not provided with a curved surface as shown, or if such a plug is entirely eliminated, the treating action will be only a fraction as effective as when all edge or point discharges are eliminated from the inner electrode. This has been adequately demonstrated by numerous tests which show that effectiveness of treatment can be increased many fold by eliminating such discharges from adjacent the inner electrode. It is usually preferable to also prevent any point or edge discharges from the inner surface of the outer electrode, and for this reason the inner surface is made smooth to prevent point discharges.

As the suspension moves into the lower end of the container 31, it is directed toward the convex surface 40 which acts as a spreading means to direct the suspension into the space between the inner and outer electrodes. As the material moves upward therein, the carbon particles suspended therein move toward one or the other of the electrodes. If the electrodes are connected as shown, it will be found that the carbon particles move into contact with the electrode 38. When sufficient of these particles have accumulated it is possible for them to be jarred loose and move downward into the lower end of the container 31. However, in the preferred mode of operation the carbon particles are allowed to remain in contact with the inner electrode, this electrode being periodically removed along with the insulator 35, and being replaced by a clean electrode of similar design. The carbon can be readily removed from the inner electrode 38.

By the time the material reaches the upper end of the treating space 39 substantially all of the carbon particles have been removed therefrom so that the petroleum product can move through a discharge pipe 49 substantially uncontaminated. This pipe 49 communicates with the intake of the pump 20 and includes valves 50 and 51 controlling the rate of flow therethrough. A discharge pipe 52 may be connected so as to communicate with the discharge pipe 49 at a point between the valves 50 and 51 and withdraw a portion of the petroleum product. A valve 53 is included in this pipe. It will thus be apparent that the operation of the pump 20 tends not only to recirculate the petroleum product from the electric separator 30 into the electric treater 10, but also tends to draw a new supply of the petroleum product through the pipe 21 and through a valve 54 therein. By proper control of the valves 50, 51, 53, and 54 the desired proportion of these liquids can be obtained, so that the material flowing into the electric treater 10 may comprise either a new supply of petroleum product or a supply of the previously circulated petroleum product, or parts of each of these products. While the electric separator 30 of the invention can be operated successfully when the polarity of the electrodes is opposite to that shown, it has been found that far better and more rapid action takes place when the inner electrode is negative rather than when this electrode is charged positively. This feature, in conjunction with the elimination of point discharges from the electrodes is largely responsible for the successful operation of this device.

It should not be inferred that the electric separator 30 is limited to use in separating carbon particles from a petroleum product. The type of electrode structure herein shown is extremely useful in effecting other types of separations. This electrode system will produce especially desirable results in any process requiring cataphoretic treatment. Nor should it be inferred that it is always necessary to treat a material which carries solid particles in suspension for in some instances it is possible to separate liquid particles suspended in another liquid by the use of such a treater.

I claim as my invention:
1. A method of separating carbon particles from a body of oil by the use of a pair of electrodes, which method includes the steps of: establishing an electric field of greater intensity toward the negative electrode than toward the positive electrode; subjecting said carbon-containing oil to said electric field whereby said carbon particles migrate to said negative electrode and are deposited thereon; and withdrawing the oil from said field.

2. A method of precipitating carbon from a petroleum product, which method includes the steps of: subjecting said petroleum product to the action of an electric arc to form carbon particles in suspension in a liquid; removing the liquid and its suspended carbon particles from the influence of said electric arc prior to the time that all possible carbon has been formed; immediately moving said liquid and its suspended carbon particles into a unidirectional electric field whereby substantially all of said carbon particles carried by said liquid move into contact with one of the electrodes forming said electric field; withdrawing the liquid from said electric field; and again subjecting at least a portion of this liquid to the influence of an electric arc to form therein additional carbon particles, the carbon particles previously formed and removed thus not interfering with the later treatment of said liquid by said electric arc.

3. A method of precipitating carbon from a petroleum product, which method includes the steps of: subjecting said petroleum product to the action of an electric arc to form carbon particles in suspension in a liquid; removing the liquid and its suspended carbon particles from the influence of said electric arc prior to the time that all possible carbon has been formed; immediately moving said liquid and its suspended carbon particles into a unidirectional electric field of greater intensity adjacent the negative electrode than adjacent the positive electrode whereby substantially all of said carbon particles carried by said liquid move into contact with one of the electrodes forming said electric field; withdrawing the liquid from said electric field; and again subjecting at least a portion of this liquid to the influence of an electric arc to form therein additional carbon particles, the carbon particles previously formed and removed thus not interfering with the later treatment of said liquid by said electric arc.

4. In an apparatus for cataphoretically treating a suspension, the combination of: an outer electrode; an inner electrode including an end providing a convex surface with substantially no sharp edges adjacent which an electric field might concentrate; a unidirectional potential supply means electrically connected to said electrodes whereby an electric field is set up therebetween; and introducing means at one end of said inner electrode and directed toward said end thereof for moving the suspension to be treated into the space between said electrodes, said electric field moving the suspended particles in said suspension toward and into contact with said inner electrode.

5. In an apparatus for cataphoretically treating a suspension, the combination of: an outer electrode; an inner electrode; a unidirectional potential supply means electrically connected to said electrodes in such a manner that the inner electrode is negative and the outer electrode is positive whereby an electric field is set up between said electrodes which is of greater intensity adjacent the inner negative electrode than adjacent the outer positive electrode; and introducing means spaced from one end of said inner electrode and directed theretoward for moving the suspension to be treated into the space between said electrodes, said electric field moving the suspended particles in said suspension toward and into contact with said inner electrode.

6. In an apparatus for cataphoretically treating a suspension, the combination of: an outer electrode; a smooth-surface inner electrode disposed inside said outer electrode and cooperating therewith in defining a treating space, one end of said inner electrode providing a convex-surfaced head with no sharp edges thereadjacent; unidirectional potential supply means electrically connected to said electrodes and establishing a unidirectional electric field in said treating space which field is more intense adjacent said inner electrode than adjacent said outer electrode and which field is substantially uniform in intensity along said inner electrode due to said smooth surface thereof and to said convex-surfaced head; introducing means for introducing the suspension to be treated into said treating space whereby the suspended matter moves under the action of said electric field into contact with one of said electrodes; and means for withdrawing the clean liquid from said treating space.

7. A combination as defined in claim 6 in which said introducing means is in the form of an opening directed toward said convex-surfaced head, and in which said potential supply means is connected to charge the central of said electrodes negatively.

8. In combination: an electric treater including arc-establishing means therein; inlet means for introducing a petroleum product into said treater; means for energizing said arc-establishing means to set up an electric arc acting on said petroleum product to form a carbon suspension; an electric separator including a pair of electrodes defining a treating space; means for applying a unidirectional potential to said electrodes to establish an electric field therein; means communicating between said separator and said treater for conducting said carbon suspension from said treater to said separator where the carbon is moved into contact with one of said electrodes under the influence of said electric field; and means for returning at least a portion of the petroleum product to said inlet means for further treatment by said electric arc.

9. In combination in an apparatus for cataphoretically treating a suspension: an outer electrode providing a smooth inner surface; an inner electrode in said outer electrode and comprising a member with a smooth-surfaced outer surface of cylindrical shape with no sharp projections or edges adjacent which an electric field may concentrate; means for establishing a unidirectional electric field between said electrodes, said field being more intense adjacent the surface of said inner electrode than adjacent said outer electrode due to the concentric nature of said smooth surfaces of said inner and outer electrodes, but the more intense portion of said field adjacent said inner electrode being of substantially constant gradient along said entire cylindrical-shaped surface of said inner electrode due to the absence of sharp projections or edges, said field being filled with the suspension to be treated whereby the suspended particles therein migrate toward and come into contact with one of said electrodes; and means for removing the remaining liquid from the vicinity of said electric field.

10. In combination in a system for electrically treating a liquid: means for establishing a disruptive electric discharge in a body of said liquid to send an electric current through said liquid to form a suspended material therein derived from the destructive action of said discharge on said liquid; introduction means delivering the liquid to be treated to said electric discharge; withdrawal means for removing treated liquid containing said suspended material from the vicinity of said electric discharge; electrode means defining a treating space; unidirectional means for energizing said electrode means to set up a unidirectional electric field therein to separate at least a portion of said suspended material; means communicating with said withdrawal means for delivering said treated liquid to said electric field; and means for returning to said electric discharge a portion of the liquid after subjection to said electric field, whereby said portion of said liquid is again subjected to the disruptive electric discharge to send an electric current therethrough.

11. In combination in a system for electrically treating a liquid: a cataphoretic electric treater including a pair of spaced electrodes defining a treating zone; means for establishing an electric field of unidirectional character in said treating zone, said treating zone being filled with a liquid carrying suspended particles, said electric field of unidirectional character causing at least a portion of said suspended particles to migrate to one of said electrodes leaving a treated liquid; means for withdrawing a portion of said treated liquid; means for electrically treating said treated liquid thus withdrawn, said means including means for establishing a destructive electric discharge in this liquid of sufficient intensity to form suspended material therein; and means for returning the electrically treated liquid to said treating zone.

12. A combination as defined in claim 11 in which said pair of spaced electrodes comprises an outer electrode and an inner electrode, said inner electrode comprising a smooth-surfaced member with no sharp edges or projections thereon adjacent which said electric field would concentrate, whereby said unidirectional electric field is more concentrated adjacent said inner electrode than adjacent said outer electrode due to the concentric nature thereof, but whereby the more concentrated portion of said field adjacent said inner electrode has a gradient which is substantially uniform along the surface of said inner electrode.

13. A method of treating a hydrocarbon liquid, which method includes the steps of: first subjecting said hydrocarbon liquid to an electric discharge of disruptive intensity to send an electric current through said liquid to form a suspended material derived from the destructive action of said discharge on said liquid; then subjecting the treated liquid containing said suspended material to a unidirectional electric field to remove said suspended material therefrom; and removing the purified liquid from said unidirectional field.

14. A method of treating a hydrocarbon liquid, which method includes the steps of: first subjecting said hydrocarbon liquid to an electric discharge of disruptive intensity to send an electric current through said liquid to form a suspended material derived from the destructive action of said discharge on said liquid; then subjecting the treated liquid to a unidirectional electric field to remove impurities therefrom; removing the purified liquid from said unidirectional field; and recycling a portion of said purified liquid into said electric discharge of disruptive intensity whereby electric current again passes through that portion of the purified liquid which is recycled.

15. A method of separating a mixture composed of a liquid with suspended particles therein by the use of a pair of electrodes, which method includes the steps of: establishing in a body of said mixture a mixture-filled unidirectional electric field the most intense portion of which is adjacent one of the electrodes and is of substantially constant gradient throughout that length thereof which lies opposite the other electrode as distinguished from being concentrated adjacent edges or sharp projections of said one electrode, whereby said suspended particles migrate toward and come into contact with one of said electrodes forming said unidirectional electric field; removing said liquid from said field; and removing the particles deposited on said one of said electrodes.

16. In combination in an electric treater for suspensions: a tank containing said suspension; an inner electrode extending into said suspension and providing a cylindrical side surface and a convex end surface without projections or sharp edges whereby a field established thereadjacent will be of substantially uniform gradient along said surfaces as distinct from being concentrated at projections or edges; and means for establishing around said inner electrode a unidirectional field to cataphoretically deposit the material in suspension on said electrode.

17. A method of separating a mixture composed of a liquid with suspended particles therein by the use of a pair of electrodes, which method includes the steps of: establishing in a body of said mixture a unidirectional electric field the most intense portion of which is of substantially constant gradient throughout as distinguished from being concentrated adjacent edges or sharp projections of one electrode, whereby said suspended particles migrate toward and come into contact with one of said electrodes forming said unidirectional electric field; continuously introducing said mixture into said field; removing the particles deposited on said one of said electrodes; and recycling a portion of the liquid withdrawn from said field into the incoming mixture.

WILLIAM WOELFLIN.